United States Patent [19]

Mohan et al.

[11] Patent Number: 5,276,884
[45] Date of Patent: Jan. 4, 1994

[54] CONTROLLING THE INITIATION OF LOGICAL SYSTEMS IN A DATA PROCESSING SYSTEM WITH LOGICAL PROCESSOR FACILITY

[75] Inventors: Ram P. Mohan, Cupertino; Ronald Weber, Sunnyvale, both of Calif.

[73] Assignee: Amdahl Corporation, Sunnyvale, Calif.

[21] Appl. No.: 680,634

[22] Filed: Apr. 1, 1991

Related U.S. Application Data

[63] Continuation of Ser. No. 209,505, Jun. 21, 1988, abandoned.

[51] Int. Cl.$^5$ .............................................. G06F 15/16
[52] U.S. Cl. ................................. 395/700; 395/200; 364/DIG. 1; 364/280; 364/230; 364/230.5; 364/285; 364/285.4; 364/246.8; 364/246.6
[58] Field of Search ............... 395/200, 725, 650, 700, 395/575

[56] References Cited

U.S. PATENT DOCUMENTS

| | | | |
|---|---|---|---|
| 3,253,262 | 5/1966 | Wilenitz | 395/325 |
| 3,641,505 | 2/1992 | Artz | 364/200 |
| 3,812,469 | 5/1974 | Hauck | 364/200 |
| 3,832,695 | 8/1974 | Nickel | 364/200 |
| 4,184,200 | 1/1980 | Wagner et al. | 364/200 |
| 4,244,049 | 1/1981 | York et al. | 364/900 |
| 4,264,782 | 4/1981 | Konheim | 364/200 |
| 4,310,720 | 1/1982 | Check, Jr. | 364/900 |
| 4,458,315 | 7/1984 | Uchenick | 364/200 |
| 4,484,306 | 11/1984 | Kulczyckyj et al. | 364/900 |
| 4,601,011 | 7/1986 | Grynberg | 364/900 |
| 4,621,321 | 11/1986 | Boebert et al. | 364/200 |

FOREIGN PATENT DOCUMENTS

| | | | |
|---|---|---|---|
| 0099244 | 1/1984 | European Pat. Off. | G06F 15/16 |
| 0254854 | 2/1988 | European Pat. Off. | G06F 15/16 |

*Primary Examiner*—Kevin A. Kriess
*Attorney, Agent, or Firm*—Fliesler, Dubb, Meyer & Lovejoy

[57] ABSTRACT

In a computer system that has one or more primary processing units processing user tasks and at least one auxiliary processing unit servicing the primary processing units, feature control is performed by storing a authorization code in the auxiliary processing unit. When an operation to change the feature of the computer system is initiated, a signal, including a key code, is sent to the auxiliary processing unit. The auxiliary processing unit checks the key code against the authorization code, and enables the operation if the check is successful.

2 Claims, 5 Drawing Sheets

CONTROLLING THE INITIATION OF LOGICAL SYSTEMS IN A DATA PROCESSING SYSTEM WITH LOGICAL PROCESSOR FACILITY

This application is a continuation of Ser. No. 07/209,505, filed Jun. 21, 1988, now abandoned.

TECHNICAL FIELD

This invention relates to a data processing system that supports concurrent operation of multiple system control programs. Each system control program in the data processing system operates in a separate domain of facilities as though it has the control of an individual, logical computer. Specifically, the present invention relates to method and apparatus for controlling the initiation of a domain in such a data processing system.

BACKGROUND OF THE INVENTION

Doren et al, in an U.S. Pat. application entitled "DATA PROCESSING SYSTEM WITH LOGICAL PROCESSOR FACILITY", filed Nov. 12, 1986, Ser. No. 930,965, and owned by the assignee of the present invention, disclose a multi-user data processing system wherein each user is given the control of a domain of facilities. The user operates within the user's domain as though the user had control of a separate logical computer, so that the data processing system functions as multiple data processing systems.

The features of a data processing system, such as, for example, its maximum memory size or the allowable types of input/output channel operations, are often sold or leased as options. Therefore, it is often desirable to be able to control features of a data processing system. In data processing systems similar to that described by Doren et al, one such important feature is the number of domains that can be initiated concurrently in the system. Controlling the number of domains is desirable, for example, when a system installation is charged for the maximum number of domains that can be activated concurrently or when it is desirable to guarantee a minimum level of performance of the domains by regulating system resources contention.

In typical prior art data processing systems, controlling a feature of a system is achieved by storing an authorization code in a "hidden" location of the main memory. (The authorization code may be, for example, the maximum number of domains that can be started concurrently.) To change the feature of the system, a key code (which, under the above example, the key code will be the number of domains already activated in the system) will be checked against the authorization code. The feature operation will be changed when the check is successful.

One disadvantage of the above-described method is that because the authorization code is stored in the main memory, it can easily be tampered with.

An object of this invention is to provide a more secure method and apparatus for controlling the features of a data processing system, especially for controlling the number of domains which can be initiated in a multi-domain system.

SUMMARY OF THE INVENTION

In one aspect, the present invention is a method and apparatus in a data processing system for controlling a feature of a system. The system has one or more primary processing units and at least one auxiliary unit servicing the primary processing units. The method and apparatus operate to store an authorization code in the auxiliary unit. An operation to change the feature of the data processing system is accompanied with a signal, including a key code, sent to the auxiliary unit. The auxiliary unit checks the key code against the authorization code, and enables the operation if the check is successful.

In one embodiment, the authorization code is the specification of the allowable features in the data processing system, including the maximum number of domains that can be initiated concurrently in a multi-domain data processing system.

In another aspect, the present invention is a method and apparatus for controlling the initiation of a domain in a data processing system. The data processing system has at least one primary processing unit processing user tasks and one auxiliary unit servicing the primary processing unit. The primary processing unit has facilities, including processing and input/output devices that allow concurrent operation of more than one system control program. Each system control program is assigned a separate domain of facilities wherein the system control program operates as though it has control of an individual computer. The invention operates to disable, during system initialization, one or more facilities that will be assigned to a system control program. When a request is made to initiate a domain, a key code is generated. The key code is compared with an authorization code stored in a read-only device. When the key code and the authorization code are checked successfully, the disabled facilities assigned to the domain are enabled.

DESCRIPTION OF THE PREFERRED EMBODIMENT

Figure 1:
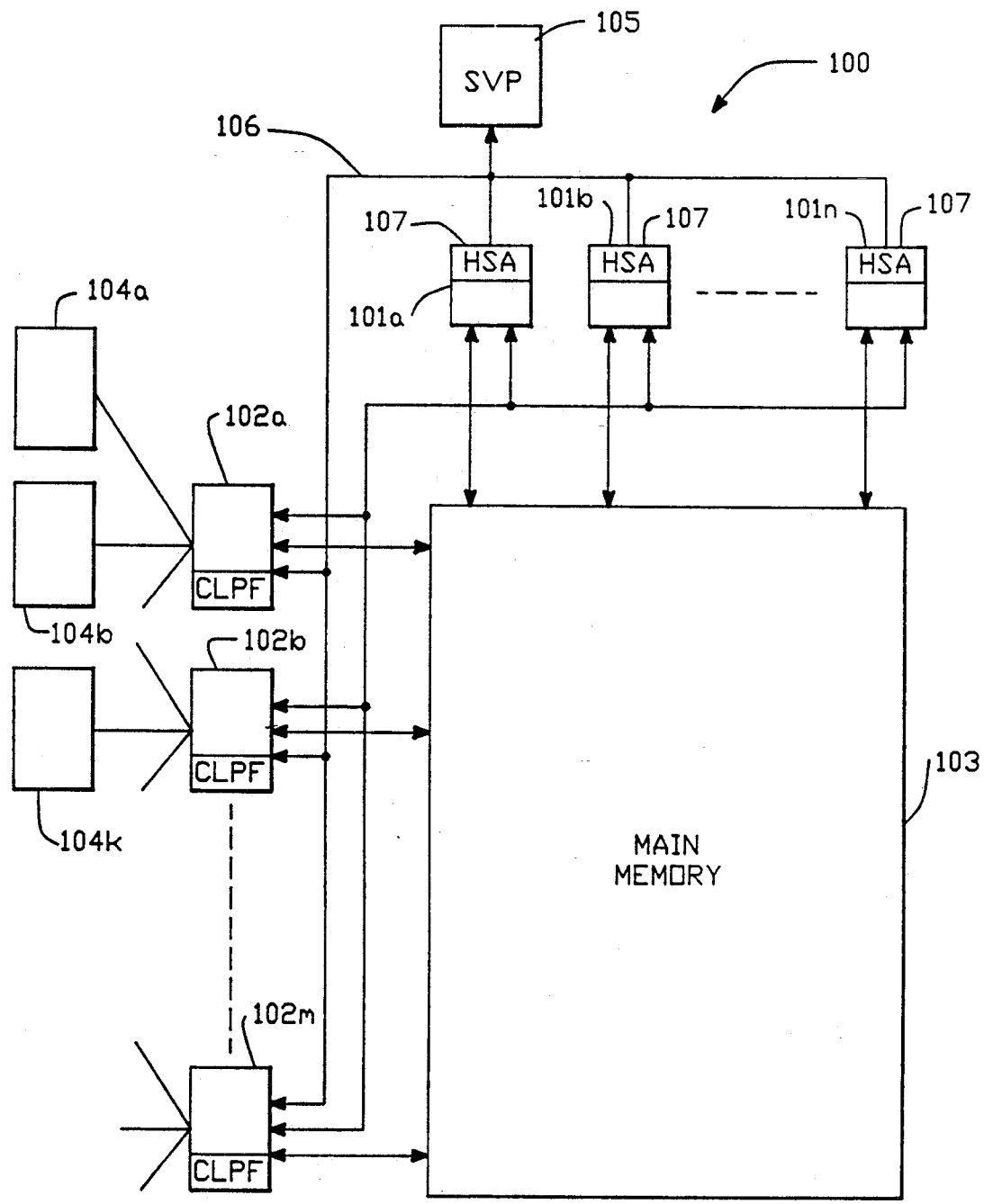
FIG. 1 is a block diagram of a computer system wherein the present invention is embodied.

FIG. 1 illustrates a computer system 100 which is architecturally similar to the Amdahl 580 family of computers and the computer system described in the above-identified Doren et al application. Computer system 100 includes one or more processors 101a, 101b, ..., 101n, and one or more input/output (I/0) channels 102a, 102b, ..., 102m. A plurality of terminals 104a, 104b, ..., 104k, including at least one operator terminal 104b, are connected to the computer system 100 via one or more of the channels 102a-102m. Each of the processors 101a-101n and channels 102a-102m is connected to the main memory 103.

The computer system 100 is further connected to at least one service processor (SVP) 105. The service processor 105 is an independent processing unit that has its own memory, its own internal and external registers, and its own input and output ports. The interface 106 between the service processor 105 and the computer system 100 includes address, data, interrupt and control lines, whereby the service processor 105 scan and set latches of the computer system 100 and also storage locations of the main memory 103. The service processor 105 performs these functions using system control facilities that are similar to the SCAN and CIC facilities of the Amdahl 580 computers.

The computer system 100 can signal the service processor 105 to perform certain functions, (e.g., taking a machine log or setting specific latches), by depositing a function code and required operands in an area called hardware storage area (HSA) 107, and by generating an interrupt signal to the service processor 105 in the interface 106. When the service processor 105 receives an interrupt from the computer system 100, it fetches the function code and associated operands or operand addresses from the hardware storage area (HSA) 107. The service processor then performs the functions according to the function code from the computer system.

Figure 2:
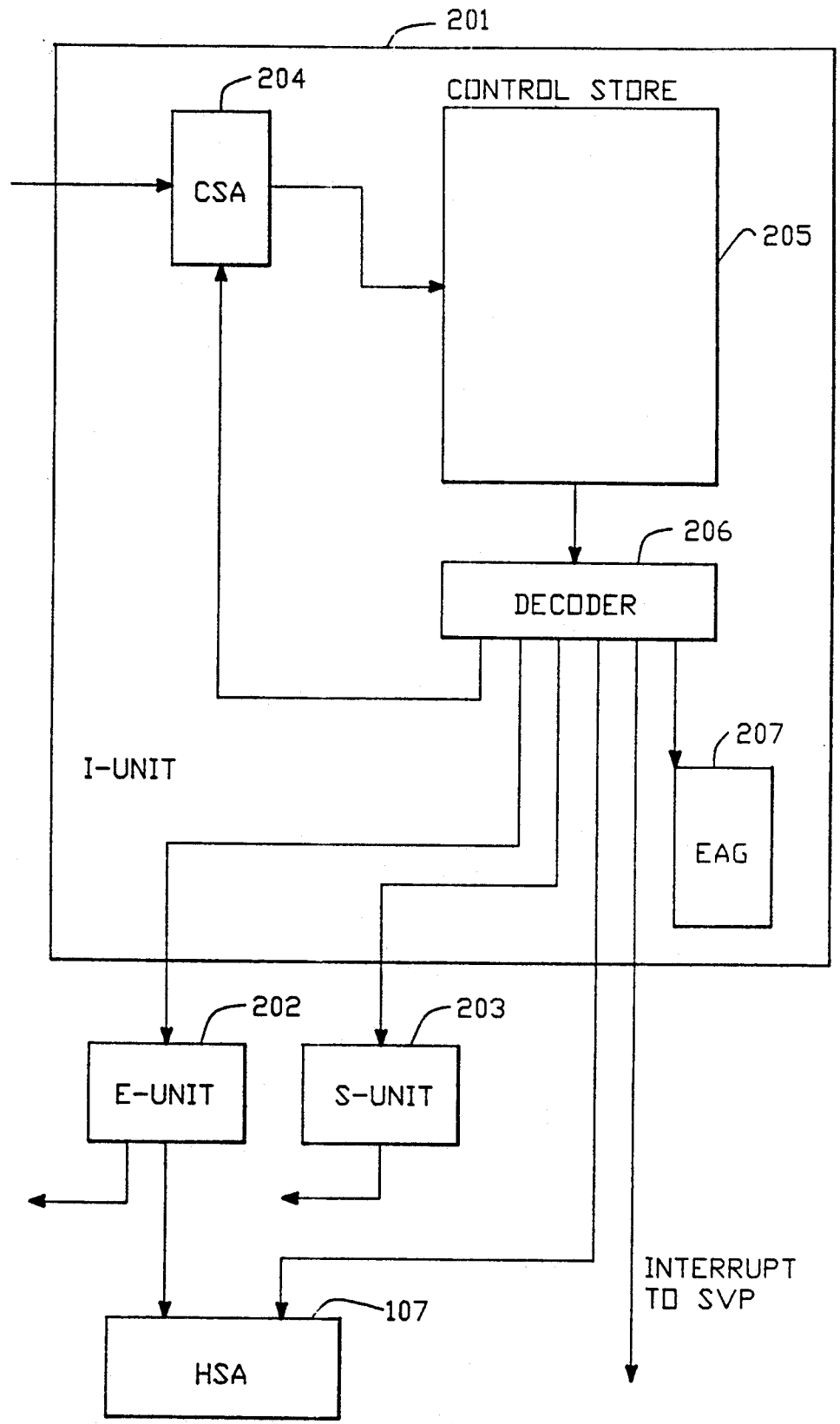
FIG. 2 is a schematic block diagram of a processor in the computer system of FIG. 1.

FIG. 2 illustrates the architecture of one of the processors 101a–101n of the computer system 100. Each of the processors 101a–101n in the computer system 100 is architecturally similar to the Amdahl 580 computer systems. Each such processor comprises an instruction unit (I-unit) 201, an execution unit (E-unit) 202 and a storage unit (S-unit) 203.

The I-unit 201 is responsible for decoding an instruction and generating signals to control the execution of the instruction. An instruction supplied to the processor 101 is received by the I-unit 201, which generates a control store address in circuit 204 based upon the opcode of the instruction. The control store address is used to fetch a microprogram instruction from the control store 205. The fetched microprogram instruction is supplied to a decoder 206 wherein a plurality of control signals are generated.

The control signals generated by the decoder 206 include address signals and control signals which are supplied to an effective address generator 207. The control signals causes the effective address generator to generate effective addresses of the operands based upon the respective address fields, such as a base field, an index field and a displacement field specified in the instruction.

The I-unit 201 also generates control signals to the S-unit 203 which fetches the operands based upon the effective addresses generated from the E-unit 202.

The I-unit 201 also generates control signals to the E-unit 202 which, in response to the control signals, performs an exception check on the operands, and/or predefined operations on the operands.

For some instructions, the control signals generated by the I-unit 201 include signals that load a function code into the HSA 107, as well as an interrupt signal to the service processor 105.

Figure 3:
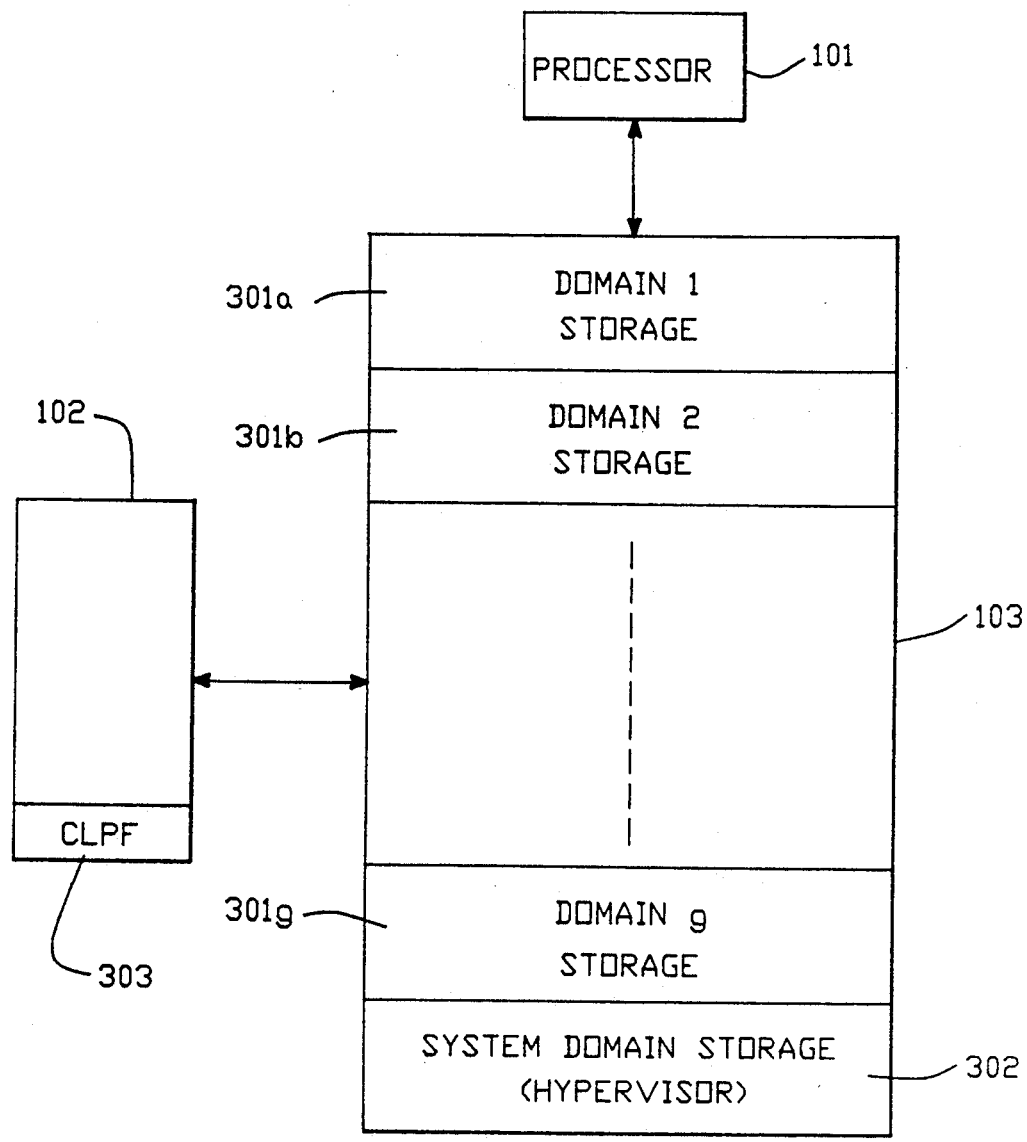
FIG. 3 is a block diagram of the computer system of FIG. 1 when operating as a multi-domain system.

The computer system 100 supports concurrent operation of multiple system control programs. FIG. 3 is a block diagram of the computer system 100 when it is operating under multiple system control programs. Each system control program runs in a separate one of a plurality of user domains 301a, 301b, ..., 301g. Each user domain is assigned facilities, including a region in main memory 103, one or more of the channels 102a–102m, and time-multiplexed services of one or more of the processors 101a–101n, so that the resident system control program operates therein as though it has control of an individual computer.

Each of the processors 101a–101n and the channels 102a–102m has two states of operation, a system state and a user state. The state of a processor or a channel is defined by a control bit "S". When a processor enters the system state, it executes instructions residing in a region of the main memory 103 called the system domain memory 302. When a processor is assigned to serve a user domain, it operates in the user state and executes instructions residing in an assigned user domain memory.

When system 100 operates as a multi-domain system, addresses used by the resident system control program will be logical. That is, the address will be relative to the beginning address of its assigned user domain memory. These logical addresses are mapped into absolute main storage address by a facility within each of the processor 101a–101n called a processor logical processor facility (not shown), and a facility within each channels 102a–102m called a channel logical processor facility (CLPF) 303. Each of the logical processor facilities adds a displacement equal to the starting address of a domain to the logical address (e.g. if a domain starts from memory location address 200,000, the displacement would be 200,000) to obtain the corresponding absolute main memory address.

Figure 4:
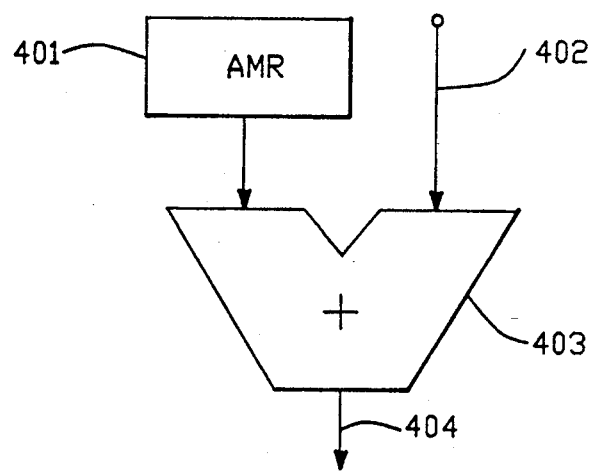
FIG. 4 is a diagram illustrating the apparatus for translating domain addresses to absolute main memory addresses.

FIG. 4 shows part of the channel logical processor facility (CLPF) 303 whereby a logical address of an input/output operation is mapped into an absolute main memory address. When a channel is assigned to a domain, the displacement (i.e., the beginning address of a domain memory) is loaded into an address modulation register (AMR) 401 within the corresponding channel logical processor facility (CLPF) 303. During input and output operations, the content of the AMR 401 will be added to a logical address by adder 403 to generate an absolute main memory address 404. At system initialization, all the address modulation registers (AMR's) are initialized to an invalid value (e.g. all "FFF,FFF,FFF").

Management and control of the domains are shared by the processors 101a–101n. A processor 101 performs the management and control functions by executing a "Hypervisor" program in the system state. Included as part of the Hypervisor functions are: domain switching, domain management, instruction emulation, adding a domain and removing a domain.

Usually, domains are added or created during the initialization of the system. To add a domain, an interactive session is initiated between the Hypervisor and the system operator. This interactive session is initiated at the operator terminal 104b and may be initiated by either pressing a special key, or by entering a special command, at the terminal 104b.

During the interactive session, the characteristics of the required domain are defined. Included as part of the defined characteristics is the information given in the following Table 1.

TABLE 1

| Information of a user domain | |
|---|---|
| Domain number: 2 | |
| Number of processors: 3 | |
| Domain storage size: n megabytes | |
| channels: | |
| system channel address | domain channel address |
| 5 | 1 |
| 7 | 0 |
| 8 | 10 |
| . | . |

TABLE 1-continued

Information of a user domain

Domain number: 2
Number of processors: 3
Domain storage size: n megabytes
channels:

| system channel address | domain channel address |
|---|---|
| . | . |
| . | . |
| . | . |

When the Hypervisor receives the domain definition, it allocates a region of main memory 103 to the domain. The allocation is based upon the occupancy of the main memory 103, as well as the domain storage size defined during the interactive session. After the memory region has been allocated, the Hypervisor puts the domain beginning address into a location of the main memory 103. If several domains are initiated simultaneously, more than one address are put in consecutive locations of the memory 103.

As part of the routine to add a domain, the Hypervisor issues a "load address modulation register" (LAMR) instruction. Exemplary format of the LAMR instruction is:

LAMR R1, R2, B, D

In the exemplary instruction, R1 and R2 are addresses of the address modulation registers to be loaded, B is a general purpose address register field and D is a displacement field. The exemplary instruction specifies that the address modulation registers starting from R1 to R2 are to be loaded by operands stored in the main memory 103. The respective locations of the operands can be obtained by adding the displacement field D to the content of register B. It will be understood by those skilled in the art that other formats, such as an IBM System/370 SI instruction format can also be used for the LAMR instruction.

Figure 5:
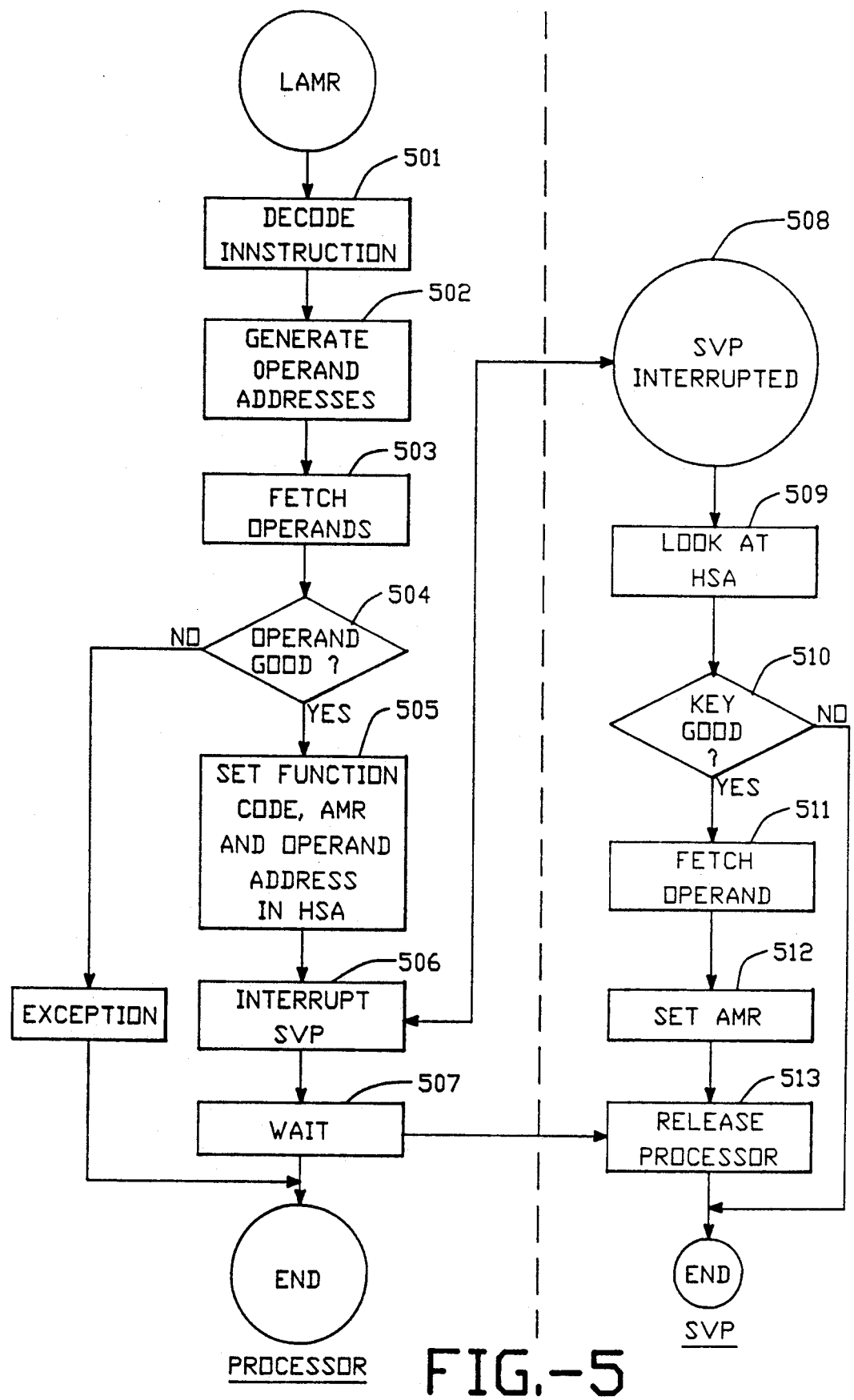
FIG. 5 illustrates the load address modulation register (LAMR) operation of the computer system.

FIG. 5 illustrates the operation of the processor 101 when an LAMR instruction is executed. The I-unit 201 decodes the LAMR instruction (501) and generates a control store address. The control store address is supplied to the CSA 204 whereby a control word is accessed from the control store 205. The control word is loaded into the decoder 206 from which a plurality of control signals are generated.

The control signals generated by the decoder 206 include control signals and the address signals (B and D) supplied to the effective address generator 207. Effective address generator 207 generates an effective address of the operands (block 502) from address signals. The S-unit 203 then uses this effective address to fetch the operands and supplies them to the E-unit 202 (block 503).

The E-unit checks the validity of the operands (block 504). If the operands are valid, the effective address of the source data operand and the addresses of the target address modulator registers (AMR's) are deposited into the HSA 107. The processor 101 also deposits a predefined function code (block 505) in the HSA 107. The processor 101 then raises an interrupt signal to the SVP 105 (block 506) and waits for a release from the SVP 105 (block 507).

Figure 6:
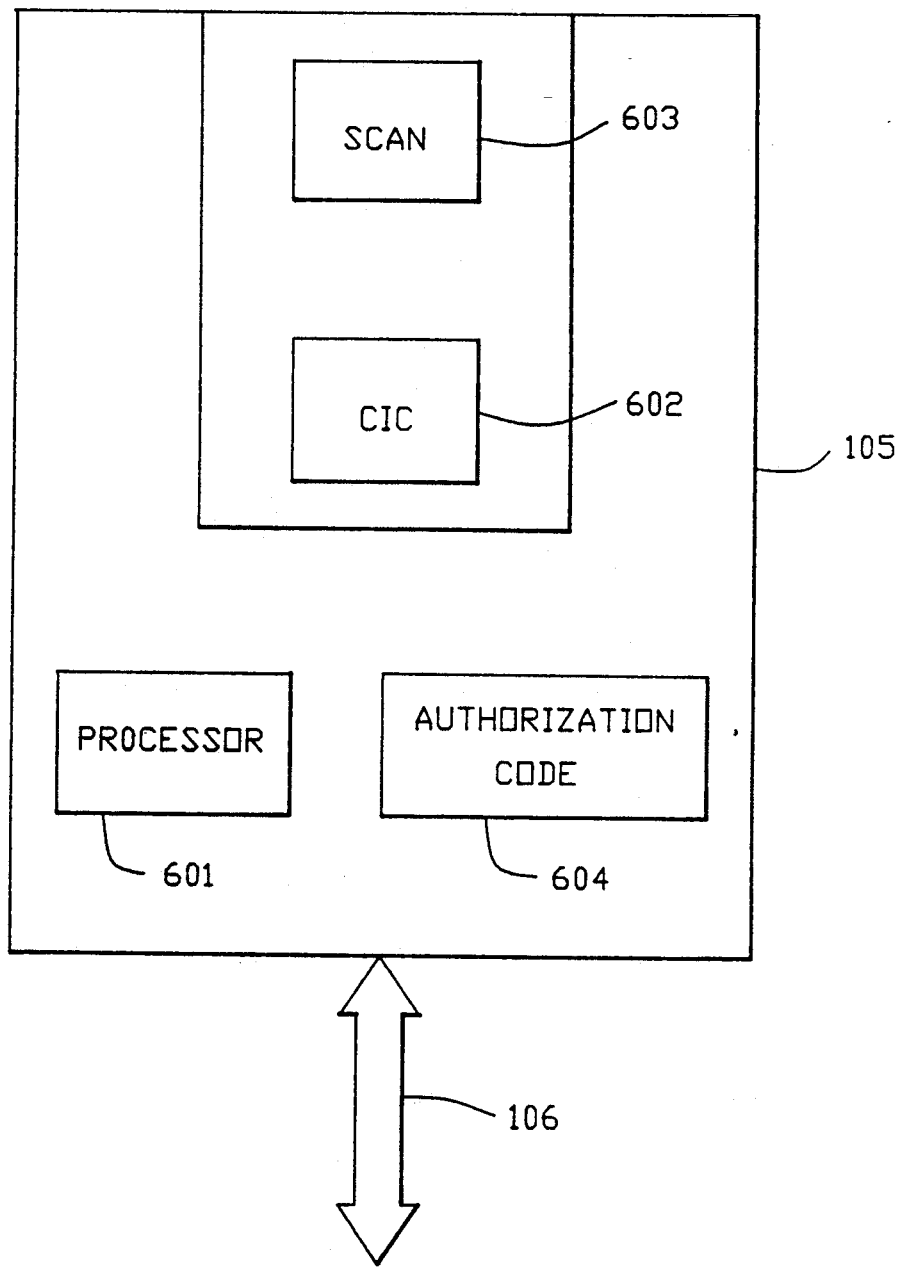
FIG. 6 is a block diagram of the service processor connected to the computer system of FIG. 1.

When the SVP 105 of FIG. 6 is interrupted by the processor 101 (block 508), it fetches the function code from the HSA 107 (block 509). Upon decoding the function code, the SVP 105 recognizes that a LAMR instruction is requested. Next, the SVP 105 accesses a key code that corresponds to the request. The key code can either be supplied by the processor 101 as part of the information deposited in the HSA 107, or it can be generated by the services processor 105. In the preferred embodiment, the key code is the number of domains already activated in the system 100. The key code is checked against an authorization code (block 510) which is the number of domains allowed to be activated concurrently in the system 100.

The authorization code is stored in an read-only device. The read-only device can be located either as part of the computer system 100, or inside the service processor 105 (as block 604 illustrated in FIG. 6). The read-only device 604 can either be a switchable plug or a programmable read only memory device (PROM). The service processor accesses the read-only devices 604 as one of its external registers. Alternatively, however, the service processor 105 can access the read-only device 604 using the SCAN facility, that is the service processor can scan the read-only device 604 as one of the latches.

When the key code corresponding to the request is good, the service processor 105 uses the effective addresses stored in the HSA to fetch the operands of the LAMR instruction (block 511). This operation is performed using the SCAN facility 603 of the service processor 105 in essentially the same way as in the Amdahl 580 systems. After the operands are fetched, the service processor 105 loads the specified address modulation registers with the operands (block 512). This operation is also performed using the SCAN facility 603 of the service processor 105 also in essentially the same way as in the Amdahl 580 systems. When finished, the service processor 105 sends a release signal to the processor 101 to take it out of the wait state (block 513). A pseudo code program of the above service processor operation is listed in the following Table 2:

TABLE 2

```
Procedure Interrupt Handler:
/* when service processor is interrupted by the
main processor */
    Begin;
        Read HSA;
/* store content of HSA*/
        Buffer = HSA;
/* check function code from main processor */
        If (Buffer[function code] = LAMR)
            call LAMR;
        Else
            ....
    End;
Procedure LAMR
    Begin;
/*read authorization code */
        authorization code = register a;
        key code = Buffer[key code]
        If (authorization code = key code);
/* get AMR addresses */
        LAMR@ = Buffer[LAMR addresses];
/* get address of AMROPND */
        AMROPND@ = Buffer[memory address]
/* get operands for loading AMR */
        operand = call SCANread (AMROPND@);
/* write AMR */
        call SCANwrite (LAMR@, operand);
/* release main processor */
        call SCANwrite (release processor);
    end;
```

If the key code corresponding to the request is not good, (for example, when the maximum number of domains have already been activated), the service processor 105 returns a bad condition code to the processor 101 and releases it without loading the address modulation registers. Since the address modulation registers were initialized to an invalid value, the channels assigned to the corresponding domain cannot operate. As a result, the domain will become inoperative.

While the invention has been particularly shown and described with reference to the preferred embodiment thereof, it will be understood by those skilled in the art that changes in form and details may be made therein without departing from the spirit and the scope of the invention.

We claim:

1. An apparatus for limiting the number of domains in a multidomain computer system that can be created by a user wherein each domain within said multidomain computer system the user specifies the operating systems, the number of processors, the amount of memory and the I/O resources, said multidomain computer system employing an I/O instruction to set up the I/O resources requested by a user in creating a domain, said apparatus comprising:

read only storage means for storing the maximum number of domains that can be created by said user of said multidomain computer system;

dynamic storage means for storing the number of domains presently existing for said user;

disabling means for disabling said requested I/O resources in response to the issuing of said I/O instruction;

comparison means for comparing in response to the issuing of said I/O instruction the number of existing domains stored in said dynamic storage means with said maximum number of domains stored in said read only memory and for generating a first signal if the number of domains stored in said dynamic memory is less than the maximum number of domains stored in said read only memory; and enabling means in response to said first signal for enabling said disabled I/O resources for use in the domain being created by said user thereby allowing I/O facilities to be functional only in authorized domains, thereby maintaining a minimum level of performance of the domains active in the multidomain computer system.

2. A method for limiting the number of domains in a multidomain computer system that can be created by a user wherein said multidomain computer system includes a secure read only memory and at least one dynamic storage means wherein each domain within said multidomain computer system the user specifies the operating systems, the number of processors, the amount of memory and the I/O resources, said multidomain computer system employing an I/O instruction to set up the I/O resources requested by a user in creating a domain, said method comprising computer implemented steps of:

storing the maximum number of domains that can be created by said user of said multidomain computer system in said read only memory;

storing the number of domains presently existing for said user in said dynamic storage means;

disabling said requested I/O resources in response to the issuing of said I/O instruction;

comparing in response to the issuing of said I/O instruction the number of existing domains stored in said dynamic storage means with said maximum number of domains stored in said read only memory;

generating a first signal if the number of domains stored in said dynamic storage means is less than the maximum number of domains stored in said read only memory; and enabling in response to said first signal said disabled I/O resources for use in the domain being created by said user thereby allowing I/O facilities to be functional only in authorized domains, thereby maintaining a minimum level of performance of the domains active in the multidomain computer system.

* * * * *